United States Patent
Voas et al.

(10) Patent No.: US 6,188,399 B1
(45) Date of Patent: Feb. 13, 2001

(54) MULTIPLE THEME ENGINE GRAPHICAL USER INTERFACE ARCHITECTURE

(75) Inventors: Ed Voas; Arnaud Gourdol, both of Sunnyvale, CA (US)

(73) Assignee: Apple Computer, Inc., Cupertino, CA (US)

(*) Notice: Under 35 U.S.C. 154(b), the term of this patent shall be extended for 0 days.

(21) Appl. No.: 09/074,519

(22) Filed: May 8, 1998

(51) Int. Cl.[7] .................................................. G06F 3/14
(52) U.S. Cl. ............................................................ 345/334
(58) Field of Search ................................... 345/334, 333, 345/335, 339, 340, 326

(56) References Cited

U.S. PATENT DOCUMENTS

| | | | |
|---|---|---|---|
| 4,712,191 | 12/1987 | Penna | 345/356 |
| 4,769,636 | 9/1988 | Iwami et al. | 345/340 |
| 4,819,192 | 4/1989 | Kuragano et al. | 345/421 |
| 4,866,638 | 9/1989 | Cosentino et al. | 345/335 |
| 5,003,499 | 3/1991 | Fujiwara et al. | 707/520 |
| 5,093,907 | 3/1992 | Hwong et al. | 345/473 |
| 5,101,364 | 3/1992 | Davenport et al. | 345/328 |
| 5,121,478 | 6/1992 | Rao | 345/346 |
| 5,179,700 | 1/1993 | Aihara et al. | 345/326 |
| 5,202,961 | 4/1993 | Mills et al. | 345/328 |
| 5,220,675 | 6/1993 | Padawer et al. | 345/333 |
| 5,287,514 | 2/1994 | Gram | 345/333 |
| 5,327,529 | 7/1994 | Fults et al. | 345/335 |
| 5,341,466 | 8/1994 | Perlin et al. | 345/439 |
| 5,353,391 | 10/1994 | Cohen et al. | 345/435 |
| 5,359,712 | 10/1994 | Cohen et al. | 345/328 |
| 5,363,482 | 11/1994 | Victor et al. | 345/346 |
| 5,371,844 | 12/1994 | Andrew et al. | 345/334 |
| 5,388,202 | 2/1995 | Squires et al. | 345/334 |
| 5,394,521 | 2/1995 | Henderson, Jr. et al. | 345/346 |
| 5,428,730 | 6/1995 | Baker et al. | 345/335 |
| 5,438,659 | 8/1995 | Notess et al. | 345/335 |
| 5,452,406 | 9/1995 | Butler et al. | 345/426 |
| 5,485,600 | 1/1996 | Joseph et al. | 395/500.34 |
| 5,600,778 | 2/1997 | Swanson et al. | 345/333 |
| 5,603,034 | 2/1997 | Swanson | 395/701 |
| 5,675,220 | 10/1997 | Dault et al. | 315/77 |
| 5,880,729 | * 3/1999 | Johnston, Jr. et al. | 345/348 |
| 5,905,492 | * 5/1999 | Straub et al. | 345/333 |
| 5,917,487 | * 6/1999 | Ulrich | 345/340 |
| 5,959,624 | * 9/1999 | Johnston, Jr. et al. | 345/334 |

FOREIGN PATENT DOCUMENTS

| 561517 | 2/1993 | (EP) . |
|---|---|---|
| 0650114A2 | 4/1995 | (EP) . |

OTHER PUBLICATIONS

PCT Search Rep., Aug. 17, 1995.
Burge, T., et al., "Advanced OS/2 Presentation Manager Programming", pp. 64–66, 139–148 (1993).
"OS/2 2.1 Unleased", pp. 152–157, 193 and 222–229 (1993).
Levinson, S., "Now That I Have OS/2 On My Computer, What Do I Do Next?" pp. 11–13 (1992).
IBM Technical Disclosure Bulletin, vol. 34, #11, "Contextual Animated–Open Window Control" pp. 68–69, Apr. 1992.
Osborne, J. et al., "Working In The Third Dimension," pp. 103–114, Sep. 1993.
IBM Technical Disclosure Bulletin, vol. 37, #3, "User Interface Technique For Selecting Multiple Interface Themes", pp. 635–638, Mar. 1994.

(List continued on next page.)

Primary Examiner—Crescelle N. dela Torre
(74) Attorney, Agent, or Firm—Burns, Doane, Swecker & Mathis, L.L.P.

(57) ABSTRACT

Systems and methods for providing a user with increased flexibility and control over the appearance and behavior of objects on a user interface are described. Sets of objects can be grouped into themes to provide a user with a distinct overall impression of the interface. These themes can be invoked by calling a corresponding theme engine. Theme engines can be hard-coded or data-driven.

16 Claims, 9 Drawing Sheets

OTHER PUBLICATIONS

IBM: OS/2 2.0 "Presentation Manager Graphics Programming Guide," pp. 5–1 to 5–5 and 7–1 to 7–9 (Mar. 1992).

McComb, G., et al., "Macintosh Graphics," pp. 49, 50, 107 and 108 (1985).

Apple Computer Inc., "Inside Macintosh," vol. 1, pp. I–272 to I–274 and I–297 to I–300 (1985).

Apple Computer Inc., "Inside Macintosh," vol. III, pp. III–195 to III–200 (1985).

Apple Computer Inc., "Inside Macintosh," vol. V, pp. V–197 to V–213 (1988).

Apple Computer Inc., "Inside Macintosh," vol. VI, p. 17–25 (1988).

Butler, C.J., BYTE Magazine, "Turbo Pascal Windowing System—TWindows lets you add windows to your application programs," pp. 283 to 291, Feb. 1989.

Atkinson, H.H. et al., "Filling by Quadrants or Octants," pp. 138–155 (1986).

Abram, G. et al., ACM., vol. 19, No. 3, "Efficient Alias–free Rendering using Bit–masks and Look–up Tables," pp. 53–59 (1985).

Perlin, K., ACM., vol. 19, No. 3, "An Image Synthesizer," pp. 287–296 (1985).

Peachey, D., ACM., vol. 19, No. 3, "Solid Texturing of Complex Sufces," pp. 279–286 (1985).

Ying, D. et al., Computer Graphics Forum 4, "Arbitrary Area Filling in a Fast Procedure," pp. 363–370 (1985).

Shinde, Y. et al., Computer Graphics Forum 5, "Algorithms fo Handling the Fill Area Primitive of GKS," pp. 105–117 (1986).

Gourret, J.. et al., "Irregular Polygon Fill Using Contour Encoding," pp. 317–325 (undated).

Roberts, W. et al., "Computer Graphics Forum 7, First Impression of NeWS," pp. 39–57 (1988).

Myers, B. et al., ACM vol. 20, No. 4, "Creating Highly–Interactive and Graphical User Interface by Demonstration," pp. 249–258 (1986).

Brassel, K. et al., Computer Graphics, vol. 13, No. 2, "An Algorithm For Shading Of Regions On Vector Display Devices," pp. 126–133 (1979).

Lipkie, D. et al., Computer Graphics, vol. 16, No. 3, "Star Graphics: An Object–Oriented Implementation," pp. 115–124 (1982).

Lieberman, H., Computer Graphics, vol. 19, No. 3, "There's More to Menu System Than Meets the Screen," pp. 181–190 (1985).

Pavlidis, T., Computer Graphics, vol. 15, No. 3, "Contour Filling In Raster Graphics," pp. 29–36 (1981).

* cited by examiner

MULTIPLE THEME ENGINE GRAPHICAL USER INTERFACE ARCHITECTURE

RELATED APPLICATIONS

This application is related to U.S. patent application Ser. No. 08/242,963 entitled "Pattern and Color Abstraction in a Graphical User Interface", U.S. patent application Ser. No. 08/243,268 entitled "Switching Between Appearance/Behavior Themes in Graphical User Interfaces" and U.S. patent application Ser. No. 08/243,327 entitled "A System and Method for Customizing Appearance and Behavior of Graphical User Interfaces", all of which were filed on May 16, 1994 and all of which are hereby incorporated by reference. This application is also related to U.S. patent application Ser. No. 08/644,360, entitled "A Data Driven Layout Engine" filed on May 10, 1996, the disclosure of which is expressly incorporated herein by reference.

COPYRIGHT NOTICE

A portion of the disclosure of this patent document contains material which is subject to copyright protection. The copyright owner has no objection to the facsimile reproduction of the patent disclosure as it appears in the Patent and Trademark Office patent file or records, but otherwise reserves all copyright rights whatsoever.

BACKGROUND

The present invention relates generally to graphical user interfaces for computer systems. More particularly, the present invention relates to systems and methods for interfacing applications and operating systems which provide for flexible customization of graphical user interfaces.

The evolution of the computer industry is unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

One type of GUI display is based on a visual metaphor which uses a monitor screen as a work surface called a "desktop" where documents are presented in relocatable regions termed "windows". The user interacts with the computer by, for example, moving objects on the desktop, choosing commands from menus, and manipulating window controls, such as checkboxes and scroll bars. An exemplary desktop screen is reproduced as FIG. 1.

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these new resources at their disposal, application designers, and others, desire more and more control over the appearance of the display, including the desktop environment and, in particular, objects on the desktop.

Windows are one example of desktop objects which can be virtually any size, shape, or color. Some standard types of windows are commonly predefined for the interface including, for example, a document window and a dialog box. One example of a standard for a document window is illustrated in FIG. 2A. Each document window which conforms to this standard has a title bar with a title drawn in a system-defined font and color. Active document windows can also have controls as illustrated in FIG. 2A, for example, a close box, a zoom box, a size box, and scroll bars. These standard types of windows (as well as other standard desktop objects) are beyond the reach of users who wish to alter the appearance and/or behavior.

Accordingly, application developers can define their own nonstandard window types as desired, although each nonstandard window requires a relatively large block of memory. Further, even these nonstandard window types provide only limited flexibility and control over the appearance and behavior of desktop objects in that they are application-specific and do not present a consistent interface across all applications, i.e., if three different applications are running, each might present a different "look" on desktop. Once again, the user has virtually no control over the appearance and/or behavior of these nonstandard window objects.

Since the window format, including the appearance, behavior and function of standard windows and window parts, is known a priori to applications which were designed for such conventional systems, these applications are written to take advantage of such knowledge. As seen in FIG. 3, suppose, for example, that an application 10 desires to draw a rectangle in the color of the title bar (beige, in this example) in a window (not shown on the desktop). The application assumes knowledge of the color of the title bar when using predefined standard window definitions 25 and, if this application uses window definitions created by the application itself, the application will have actual knowledge of colors defined by those windows. Accordingly, the application will simply send a command to the interface instructing that a beige rectangle be drawn in the window.

Each standard window, as well as any nonstandard window, conventionally has a corresponding window definition 25. The window definition 25 includes all of the data necessary to define the window. Looking at the active window illustrated in FIG. 1, data included in the window definition 25 for such an active window would include, for example, the size of the window, the relative location of the close box and zoom box in the upper lefthand and righthand corners, respectively, the number of parallel lines and their locations relative to the close box and the zoom box, and the upper boundary of the window and all of the other defining features of that particular window. The application supplies the variable parameters such as the location of the window on the desktop interface and, perhaps, the colors and/or fonts to be used for the text and/or figures in the window. As one can imagine, the window definitions can include a large amount of data and, therefore, can require a large amount of memory for each definition.

In addition to the amount of memory used to create non-standard window definitions, another problem with this conventional method of providing variety of appearance in the graphical user interface is the lack of a consistent appearance between objects drawn on the desktop by different applications. With multitasking i.e., multiple applications running simultaneously on a desktop, it is now common for users to simultaneously run multiple applications each of which has its own window on the desktop. However, if each application uses its own combination of standard and non-standard window definitions that result in each application having its own appearance and behavior. The dissimilarity in appearance and behavior between applications can be annoying and confusing to a user.

These problems have been addressed in the above-identified, related applications by providing systems and methods for generating different themes which allow application designers and application users to have additional flexibility and greater control over the appearance and behavior of desktop objects and individual controls for those objects. The present invention addresses concerns associated with making themes easy to use and easily extensible for future development.

SUMMARY

According to exemplary embodiments of the present invention, an improved visual appearance can be provided to GUIs by providing a theme switching architecture that includes a plurality of theme engines. Each theme engine is designed to manage a GUI using a theme described, at least in part, according to a theme file. The different theme engines will handle different theme file formats. In this way, additional theme file types can be created and added to the Appearance Manager without requiring that the code associated with the Appearance Manager be rewritten.

According to an exemplary embodiment of the present invention, two different theme engines are provided. A first theme engine creates the GUI using a default theme that will be used if no other, valid theme files have been registered with the system. This first theme engine can be hard-coded so that its associated theme file, having a first predetermined format, contains relatively little theme data and so that this default theme runs more quickly. The second theme engine can be a parametric engine which can generate a theme using data found in a theme file having a second, predetermined format. Unlike the first engine, since the second engine is parametric in nature, plural themes can be created using the same engine simply by selecting different theme files, each having the same, second predetermined format.

BRIEF DESCRIPTION OF THE DRAWINGS

The foregoing, and other, objects, features and advantages of the present invention will be more readily understood by those skilled in the art upon reading the following detailed description in conjunction with the drawings in which.

DETAILED DESCRIPTION

The present invention is described herein by way of exemplary, illustrative embodiments, some of which use the Macintosh® computer system as a reference for explaining the present invention. However, those skilled in the art will readily appreciate that systems and methods according to the present invention can be applied to any type of display system having a user interface. Further, while window objects are used to illustrate how exemplary embodiments of the present invention affect the appearance and behavior of desktop objects in general, those skilled in the art will recognize that the present invention can be used to control the appearance and behavior of any desktop object including, for example, icons, menus, lists, control elements, cursors, menu bars, etc.

Figure 1:
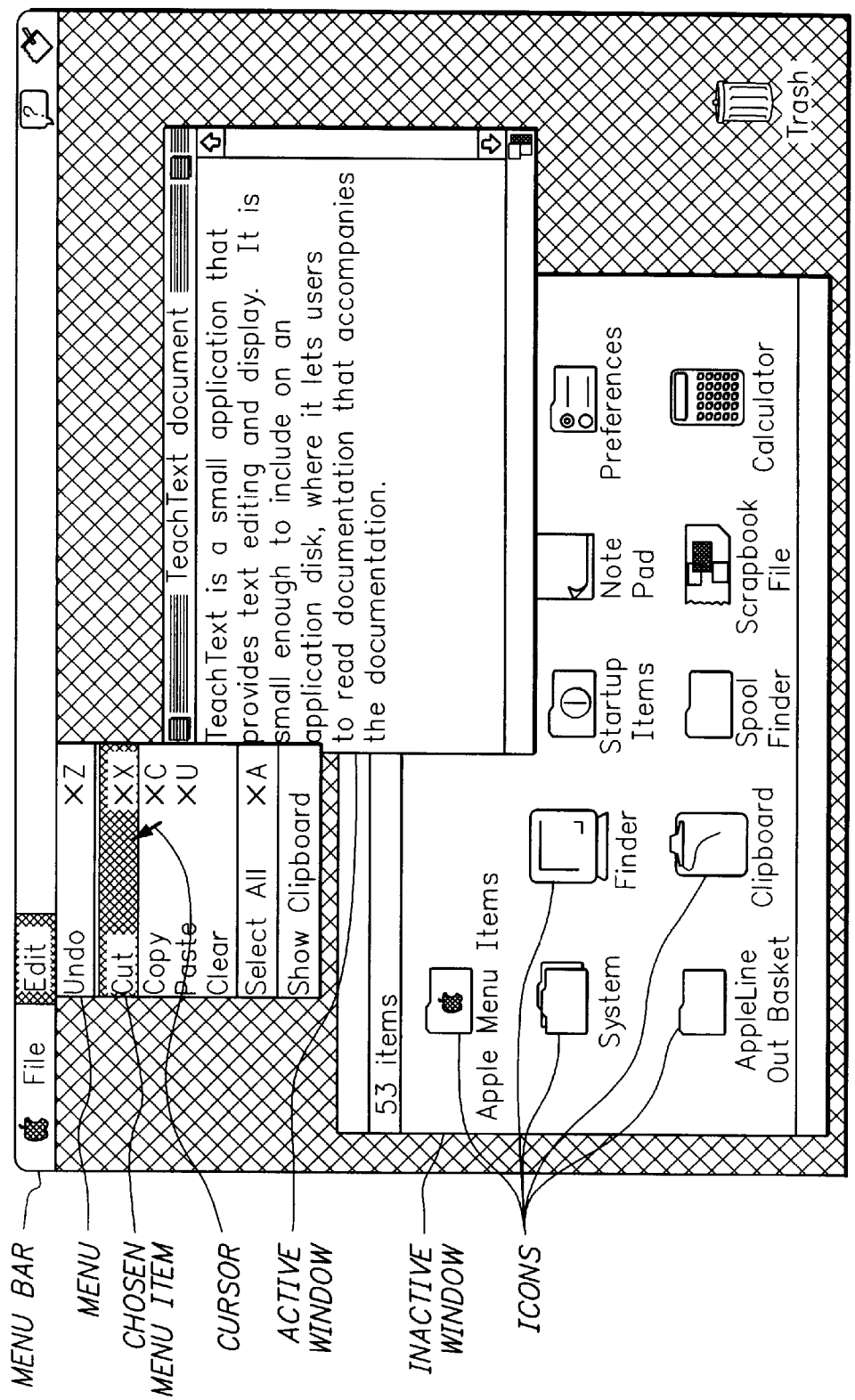
FIG. 1 shows a conventional desktop screen.
Figure 2A:
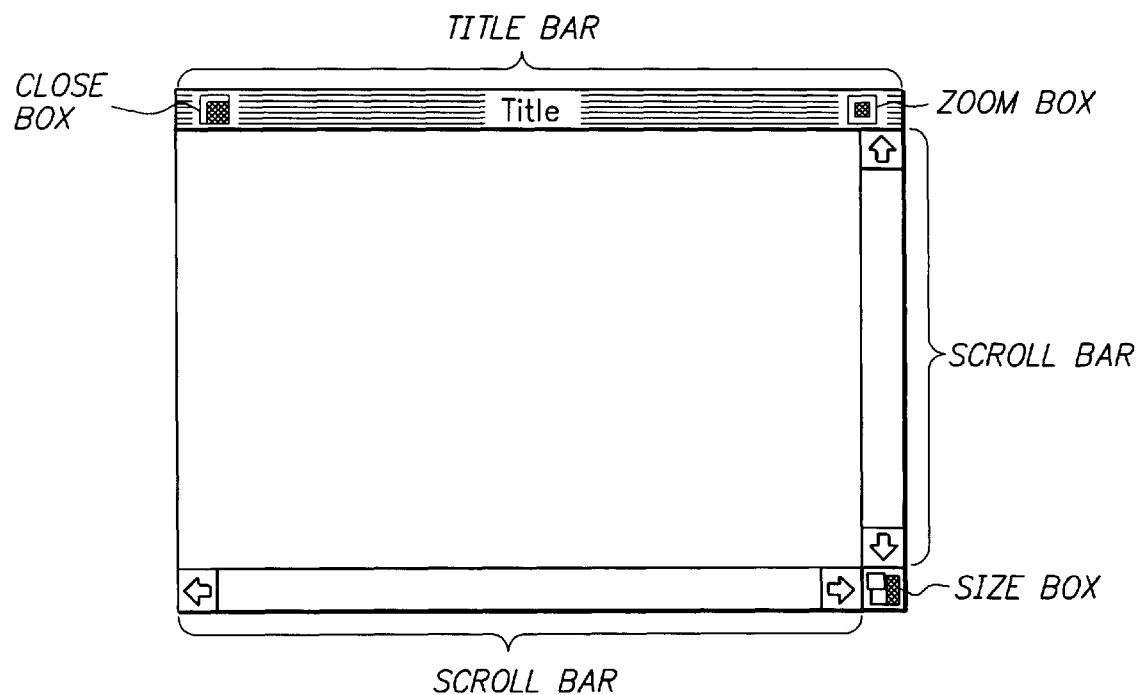
FIG. 2A shows a conventional document window.
Figure 2B:
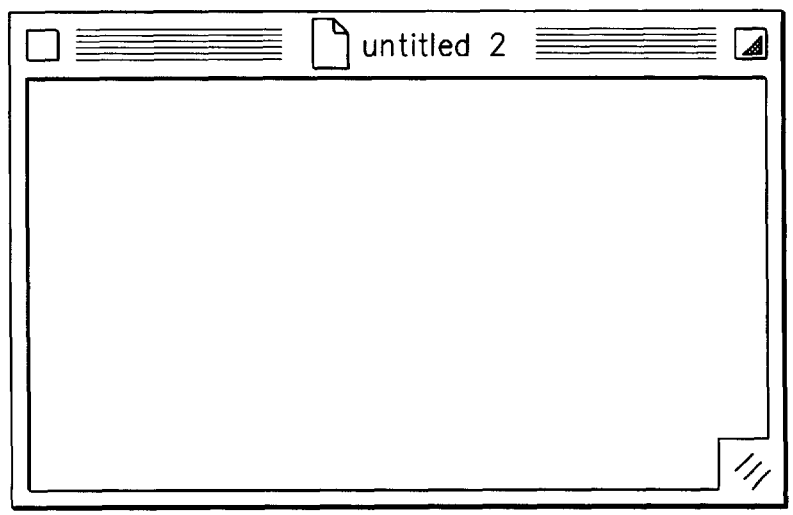
FIG. 2B illustrates a document window according to an exemplary embodiment of the present invention.

Windows can be characterized in a variety of ways. For example, a window can be characterized by the shape, size and color of the window as well as by the location, size, shape and color of its component parts, e.g., those parts identified in FIG. 2A. These attributes of a window and window parts are categorized herein as a window's appearance attributes. The window and its parts also have associated therewith one or more functions which are invoked when a user provides an associated input, e.g., clicking on a close button or box causes the window to close. These are termed functional attributes.

A third category of attributes also exists for some windows and window parts. These windows and window parts exhibit a behavior when acted on by a user which is distinct from the underlying function of these objects, i.e., when a user clicks on a close button using a mouse, the button becomes shaded in such a way that it appears depressed prior to the window actually closing. These are termed behavior attributes.

Of these three attribute categories, namely appearance, behavior and function, exemplary embodiments of the present invention provide users (the term "users" as applied throughout this document refers to, among others, end users of applications, application developers and other individuals who use or invoke operating systems) with the capability to alter the appearance and behavior of object and object parts, but preferably not the underlying function thereof. It will be understood by those skilled in the art that the principles described herein are equally applicable to systems and methods in which the functional attributes can also be varied by users. However, standardization of system functionality provides certain advantages so that exemplary embodiments of the present invention separate functional manipulation from manipulation of the other attributes.

Figure 2C:
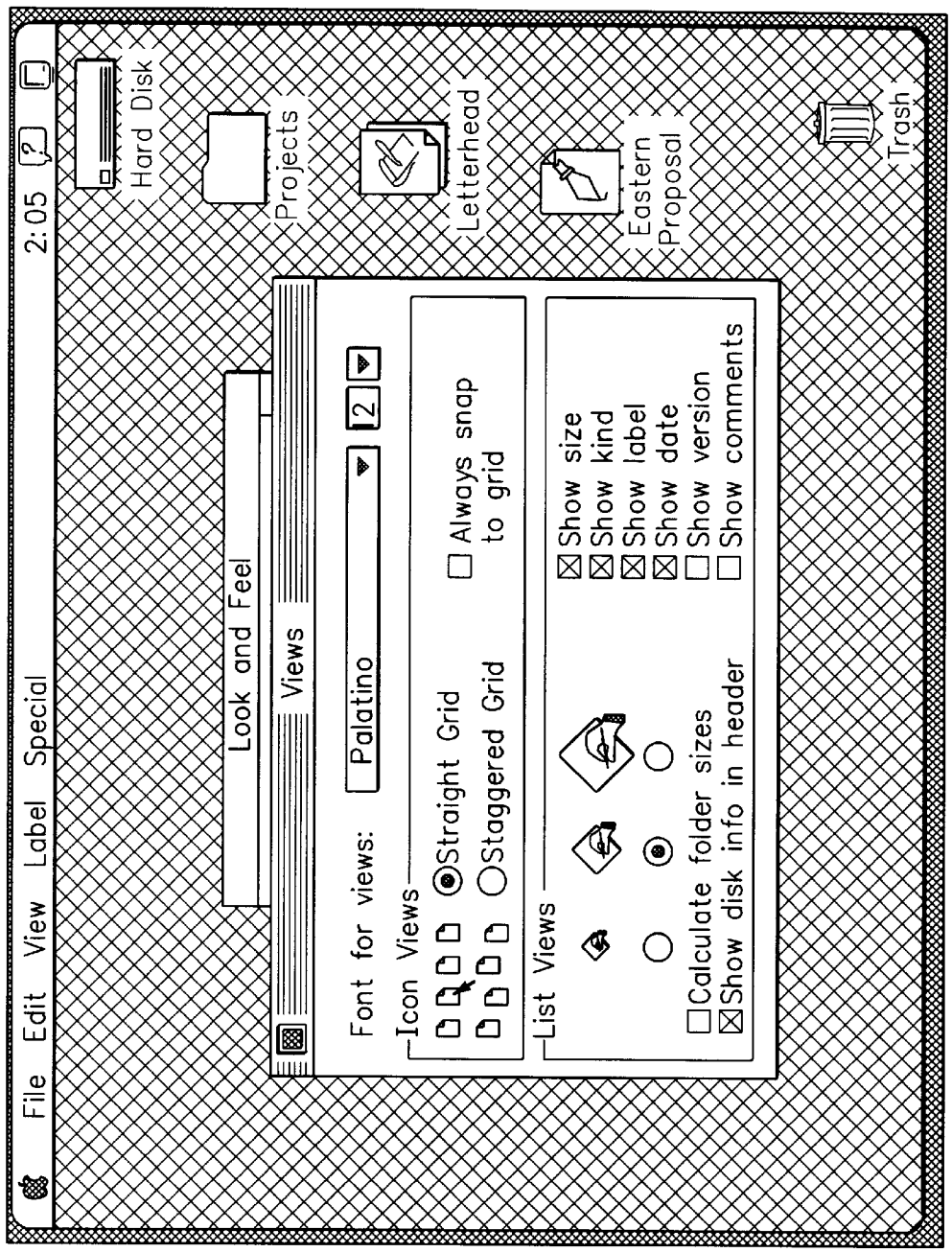
FIG. 2C illustrates a conventional user interface.
Figure 2D:
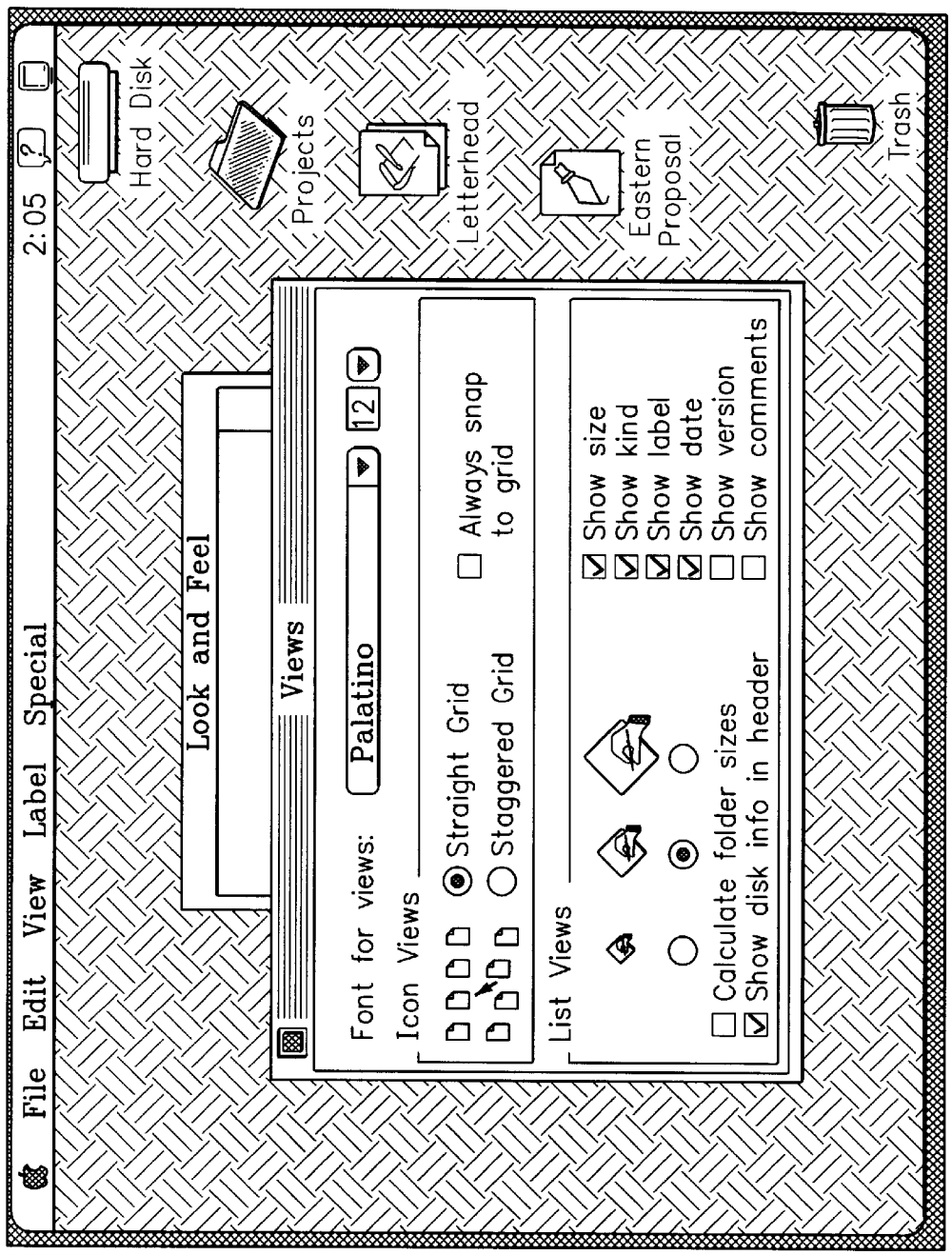
FIG. 2D illustrates the user interface of FIG. 2C operating under a theme according to an exemplary embodiment of the present invention.
Figure 2E:
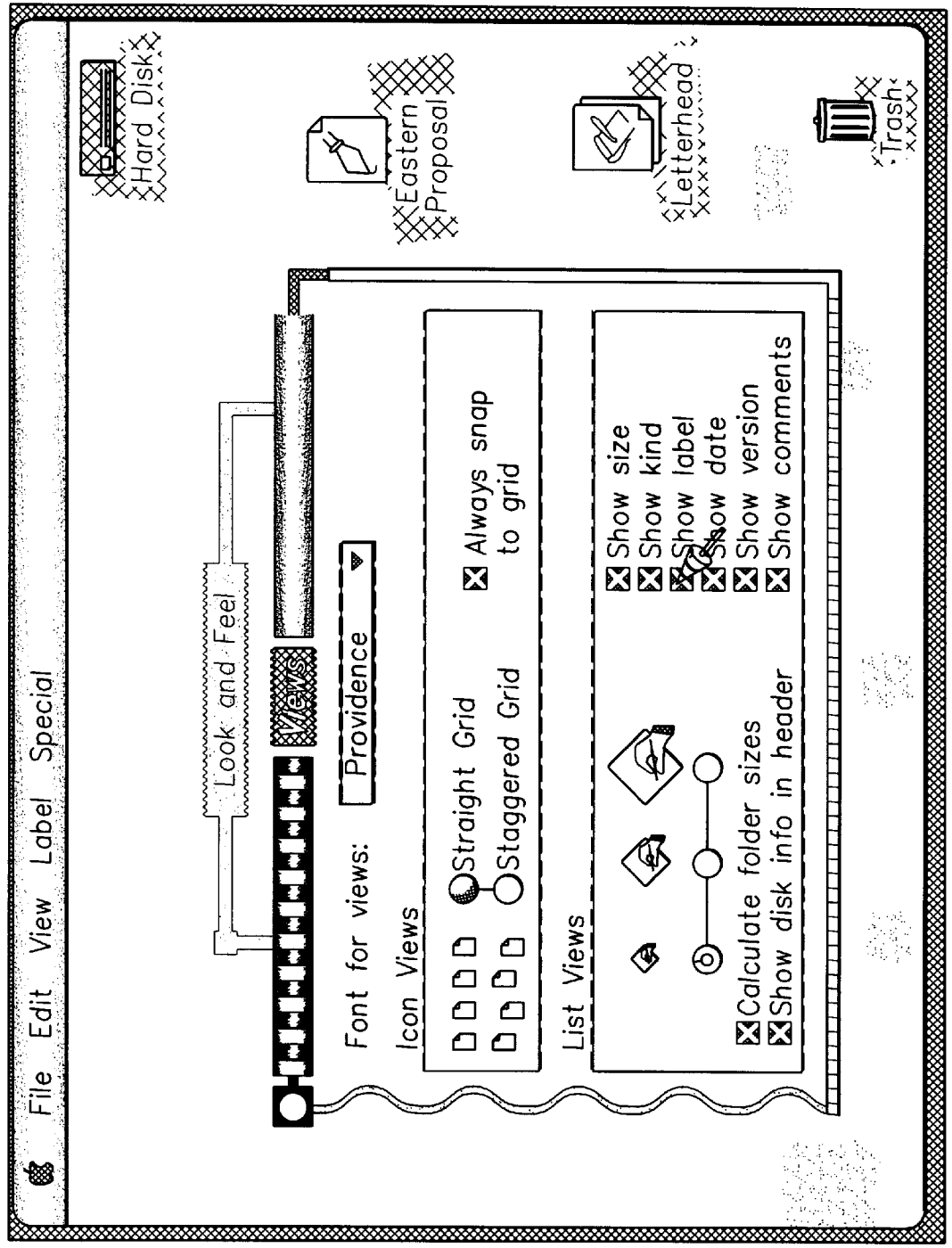
FIG. 2E illustrates the user interface of FIG. 2C operating under a second theme according to another exemplary embodiment of the present invention.
Figure 3:
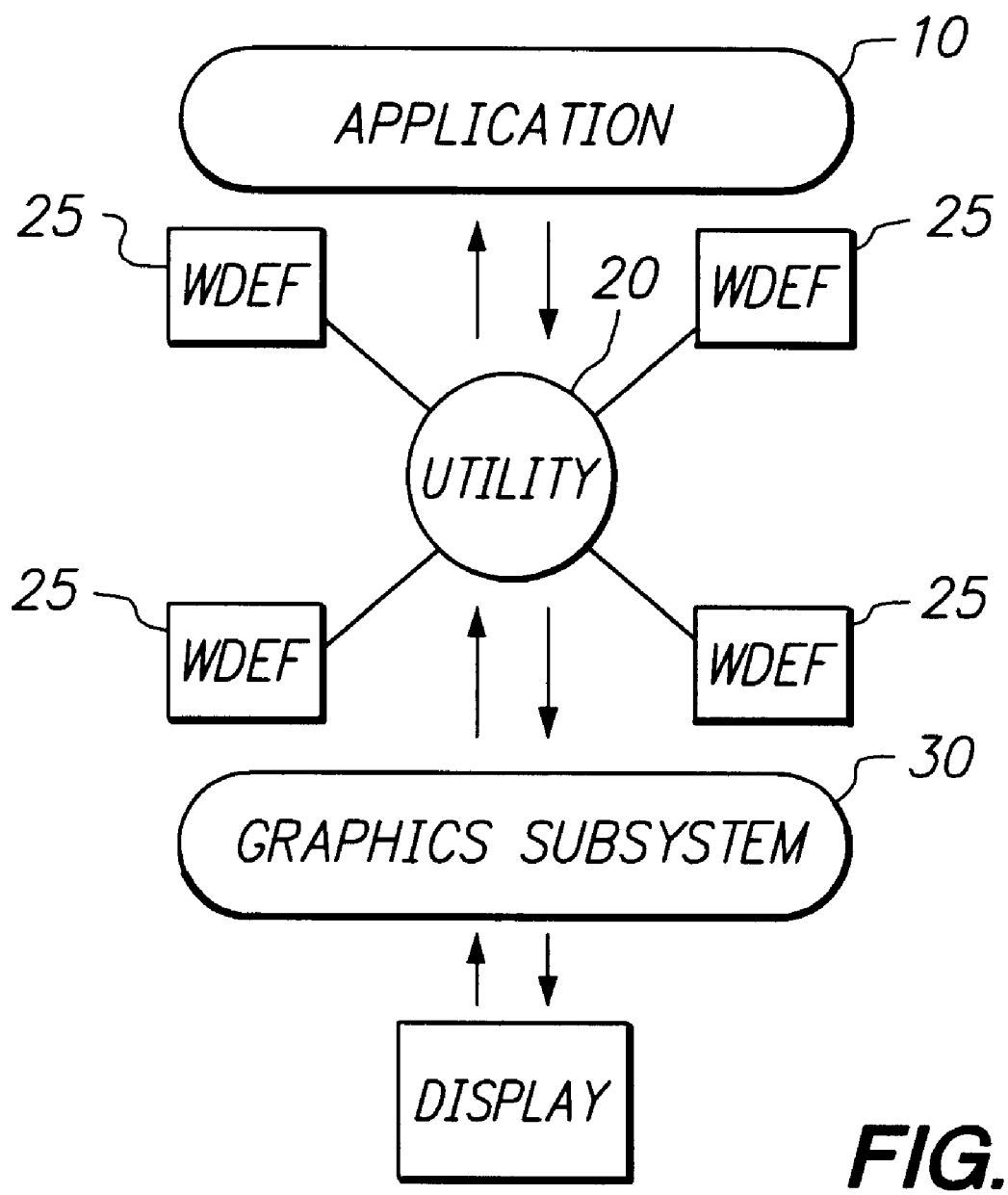
FIG. 3 illustrates a functional overview of a system for customizing a user interface according to an exemplary embodiment of the present invention.

Given all of the graphical and audio artistry available today for GUIs, one can easily imagine the wide variety of desktop "looks" which can be developed once the system's control over the appearance and behavior of interface objects is relaxed. Comparison of the conventional user interface screen shown in FIG. 2C with user interface screens using different themes shown in FIGS. 2D and 2E is an excellent starting point toward understanding the powerful capabilities for appearance and behavior change in user interfaces according to the present invention. Note, for example, the difference in appearance between the "Views" title bar in FIG. 2C as opposed to those of FIGS. 2D and 2E.

Figure 4:
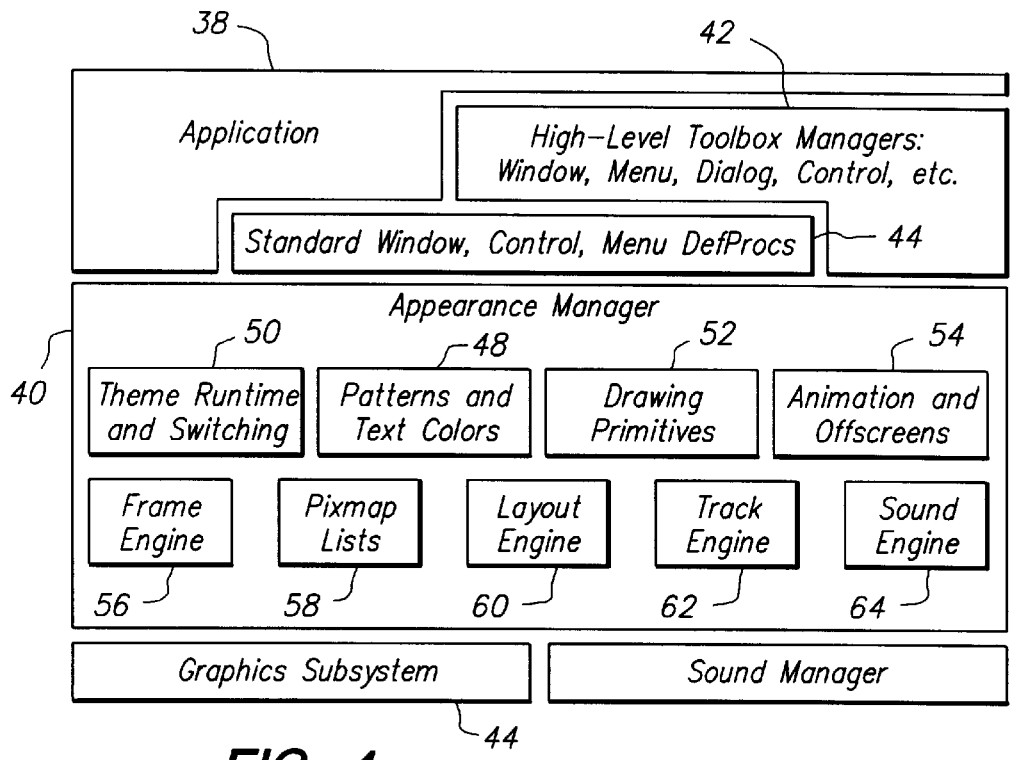
FIG. 4 illustrates an exemplary architecture showing theme and application interaction according to an exemplary embodiment of the present invention.

An overview which summarizes how these types of customized user interfaces can be provided in a consistent and switchable manner begins with a discussion of FIG. 4. As shown, the application 38 interacts with the appearance management layer 40 through three paths: directly, through utilities 42 (e.g., Toolbox Managers), and through definition procedures (defprocs) 44 which provide the fundamental instructions for drawing objects on the interface. The term "defproc" as it is used in this document refers to pieces of code which are responsible for drawing interface objects and which define the shape of those objects, e.g., window definitions. The defprocs 44 permit the creation of new themes via editing a theme data file, rather than creating customized code for each new theme.

The appearance management layer has a number of functional blocks associated therewith. For example, to provide the flexibility afforded by the present invention, applications do not need to have a priori knowledge of the patterns or colors used for each object and its controls. Therefore, a pattern and text colors function 48 is used to look up this information and serves to abstract the color and/or pattern of the object from its other attributes. According to certain exemplary embodiments, drawing primitives which allow "paint-by-number" interface drawing are sent by the client to the appearance management layer. In other words, the application can simply command the appearance management layer 40 to draw an object using an index which identifies the pattern and/or color of that object, so that the visual geometry is abstracted from the colorspace and the application need not know which particular geometries and/or colors are currently being implemented. According to other exemplary embodiments, the pattern and text colors function 48 acts as a pattern/color database and returns the relevant pattern information to the client. The client then instructs the graphic subsystem 49 to render the appropriate pattern.

In order to provide the functionality to switch between themes, the theme runtime and switching function 50 controls interaction between the appearance management layer 40 and the theme. As used herein, the terms "theme" and "themes" refer to, among other things coordinated designs of interface objects and object parts that create a distinct visual appearance, audible environment and/or behavior on the GUI. The theme runtime and switching function 50 provides mechanisms for loading and unloading themes and obtaining theme attributes, as will be described in more detail below.

Drawing primitives 52 provide support for drawing basic interface visuals, such as window headers, dialog group boxes and focus rings. The animation and offscreen function 54 provides internal support for offscreen drawing and animation. The frame engine 55 provides support for producing rectangular interface objects, such as pushbuttons, window headers and group boxes. An exemplary frame engine is described in U.S. patent application Ser. No. 08/644,361, entitled "A Data Driven System and Method for Drawing User Interface Objects" and filed on May 10, 1996, the disclosure of which is incorporated here by reference. The pixmap lists 58 provide support for bitmap-based interface objects, such as checkboxes, radio buttons, window closeboxes and zoomboxes. The layout engine 60 is used to represent complex user interface objects which change with size or content. The layouts typically contain a set of relationships which are evaluated to determine where to place patterns, bitmaps and frames to draw a complex object. More information regarding an exemplary layout engine can be found in the above-incorporated by reference U.S. patent application Ser. No. 08/644,360.

Sound engine 64 provides sound support for the toolbox 42 and defprocs 44. More information relating to the sound engine can be found in U.S. patent application Ser. No. 09/074,543, entitled "Graphical User Interfaces Having Sound Effects for Operating Control Elements and Dragging Objects", to Ulrich et al. and filed on the same date as the present application, the disclosure of which is incorporated here by reference.

Having briefly described an exemplary architecture for abstracting the appearance and behavior of a user interface from its functionality according to the present invention, the following description indicates how these capabilities can be used together to manifest sets of appearance and behavior attributes on a user interface which blend together to project a common theme. As described earlier, themes are coordinated designs of the interface elements which combine to create a distinct visual and audio environment on the display. According to one exemplary embodiment of the present invention, users can choose among different themes from, for example, an appearance control panel which can be activated on the desktop interface. An exemplary appearance control panel is illustrated as FIG. 5.

Figure 5:
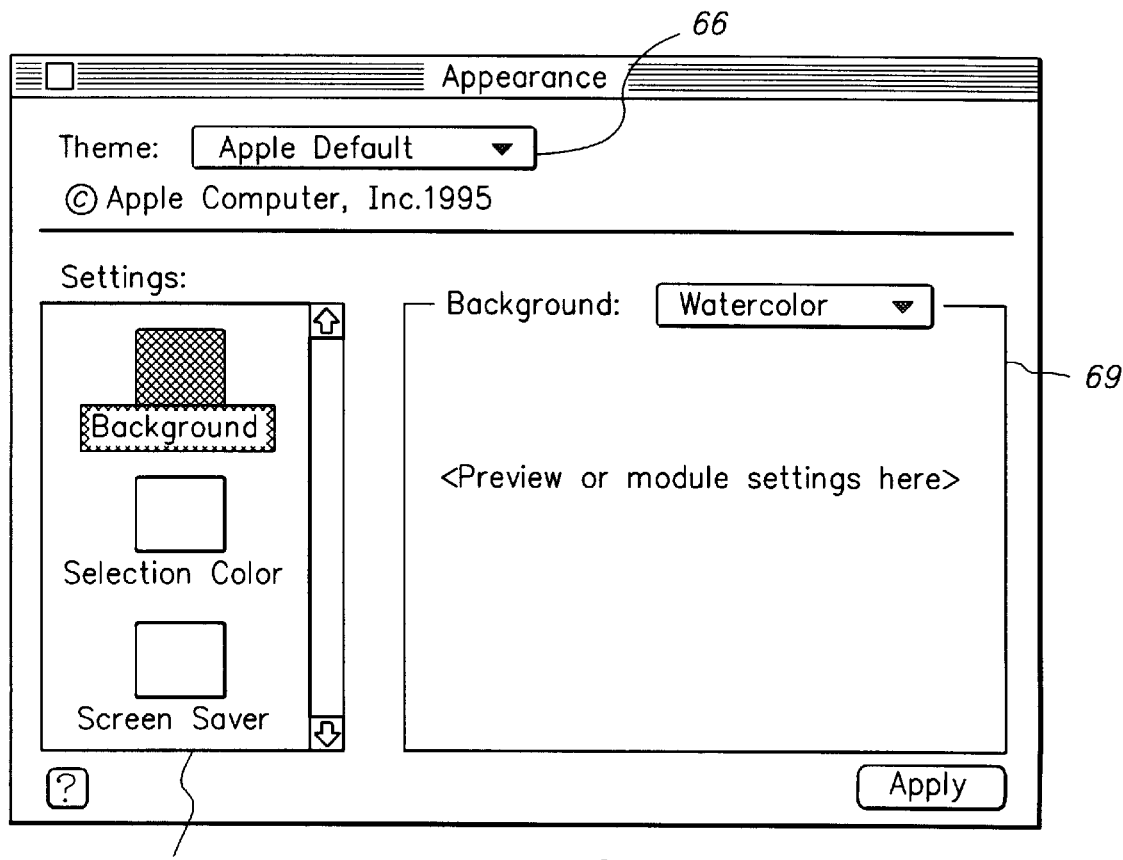
FIG. 5 depicts an exemplary appearance control panel from which a user may select a particular theme.

In FIG. 5, a pop-up, pull-down or drop-down menu 66 allows users to specify an overall appearance/behavior by selecting the theme to be installed. Beneath the theme selection menu 66 to the left is an options area 68 in which a user may select various options within each theme. For example, a user could specify a background color, a font and a highlight color. To the right of the options area 68, is a preview area 69 where exemplary interface elements of the theme currently selected in box 66 are shown so that a user can preview what the theme will look like before making a selection. Exemplary interface elements can include, for example, a desktop pattern, a menu bar and menu, an active window, and a dialog box with radio buttons, a checkbox, push buttons, and selected text. Using the appearance control panel, a user will be able to change the appearance of the desktop quickly and easily.

Once a selection is made via the appearance control panel, this selection is implemented by the present invention in the following manner, as described with respect to FIG. 6. Therein, application 38 makes requests based, for example, on user input via the appearance control panel, to the defprocs 44. These defprocs 44, in turn, call the theme runtime and switching function 50 when the requests from application 38 involve loading or unloading a theme (e.g., in response to a user's request via an appearance management control panel), getting resources or accessing properties. If the theme runtime 50 is able to load all of the necessary theme data into a data table, it will switch to the new theme. In the event that the necessary theme data is unable to be loaded, the theme runtime and switching function 50 will instead switch to a default theme and inform the user that the theme change failed.

According to exemplary embodiments of the present invention, a plurality of theme engines are provided to access the theme data files and set up the data table. Theme engines are designed to interpret corresponding theme data files and provide the API functionality associated with the corresponding theme and can be written as C++ objects. For example, the appearance management layer 40 will receive a theme file reference resulting from, for example, a user selection in the appearance control panel. From the theme file, the appearance management layer 40 extracts the file type, i.e., by reading the file extension string, and searches for a theme engine that corresponds to this theme file type. Theme engines can be added to the system at any time and will be recognized and registered at start-up by the appearance management layer 40 by virtue of their distinctive file type. If a corresponding theme engine is found, the appearance management layer 40 will instruct the selected theme engine to load the data table from that theme file. Otherwise, if no match is found, the appearance management layer will indicate that the theme file is invalid.

Figure 6:
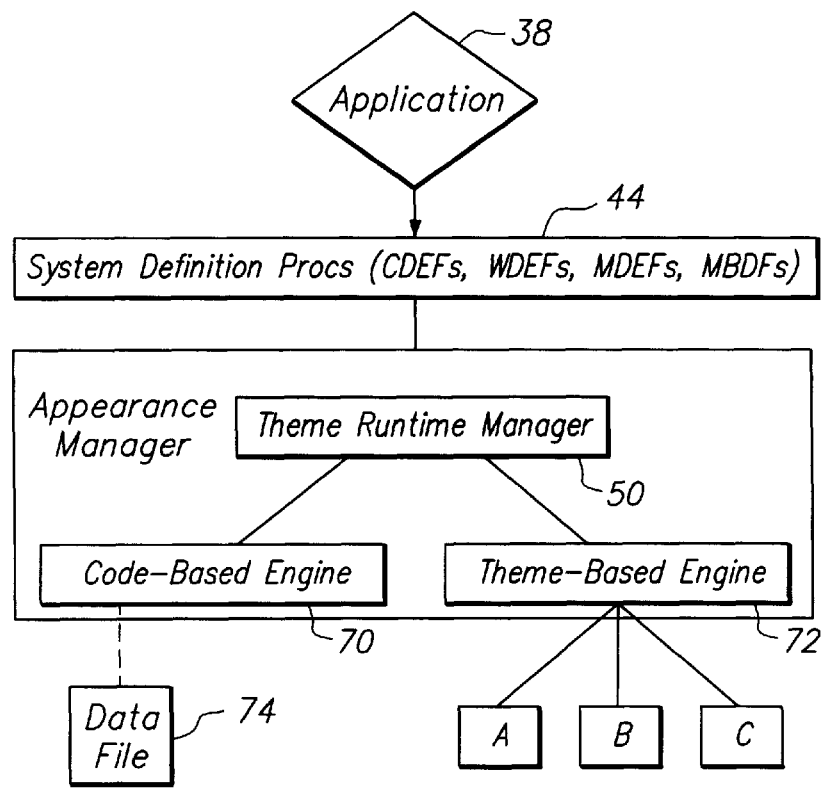
FIG. 6 illustrates a portion of the architecture which identifies the relationship between the theme runtime function in FIG. 5, plural theme engines and theme data files.

The exemplary embodiment of FIG. 6 illustrates two theme engines 70 and 72, however those skilled in the art will appreciate that the concept of theme engines is expressly intended to permit easy extensibility such that any number of theme engines may be provided. Each theme engine can be designed to operate on a specific type of theme data file, e.g., theme data files having varying amounts of theme information and/or having differing formats. The theme runtime manager 50 can review the selected theme data file and, based on its type, search for an appropriate theme engine.

The example provided in FIG. 6 depicts two theme engines, a first engine 70 that is code-based and a second engine 72 that is a parametric data-driven theme engine. The code-based theme engine 70 provides a set of hard-coded theme routines for directly rendering the objects in a consistent manner to provide a specific thematic appearance and handle object behavior for that one particular theme. Since it is hard-coded, the theme engine 70 may run more quickly than the data-driven theme engine 72. Although it is substantially a hard-coded entity, theme engine 70 may optionally (as indicated by the dotted line) have a data file 74 associated therewith. This relatively small file can, for example, include scenario and variant information, e.g., whether the theme can operate with different color schemes but the same object geometry and is primarily used as a place holder for user selection in the appearance control panel.

Moreover, the code-based theme engine 70 can be designated as the default engine to which the application or GUI can fall back on to create the interface if no other valid themes are available. Alternatively, other themes could potentially be designated as the default theme. The default theme preferably has certain characteristics. For example, the default theme should support all bit depths, i.e., the number of bits per pixels used to define the number of colors available, support a high-contrast variant which is easy for color-impaired individuals to readily understand and be able to run without external dependencies, e.g., a data file.

The data-driven theme engine 72, on the other hand, is designed to operate on theme data files having a specified set of data types and a predetermined format. However, multiple themes can be handled by the data-driven theme engine 72 as long as the data file is created in the specified manner so that it can be properly accessed by this engine. The illustration in FIG. 6 depicts three theme files 'A', 'B' and 'C', each of which have the requisite data file type to be rendered using the data-driven theme engine 72. Other theme engines, e.g., engine 70 or some other engine (not shown) would not be selected by the appearance management layer 40 to run these three themes since they would not be able to operate on this file type.

The theme data files can have certain common information used to properly run the theme. For example, the theme data files can specify the minimum bit depth needed to run the theme and the recommended bit depth specified by the theme developer for optimal appearance. These values can be used by the theme engine 72 to check to see at what bit depth the monitor is set and, if the monitor is set at a lower bit depth than required or recommended, can prompt the user to permit an automatic change in the display's operating bit depth prior to launching the theme. If the monitor doesn't support the required minimum bit depth for a selected theme, then the appearance management layer 40 may intervene, and instruct theme engine 70 to launch the default theme (which supports all bit depths) while also prompting the user of the failure to launch the desired theme. The theme data files which are operable using the theme engine 72 may also specify certain other parameters, such as the minimum title bar height, menu separator height, minimum horizontal scroll bar thumb width, minimum vertical scroll bar thumb width, horizontal slider tick mark offset and vertical slider tick mark offset, in addition to containing theme specific information regarding object geometry, fill patterns and behavior.

Figure 7:
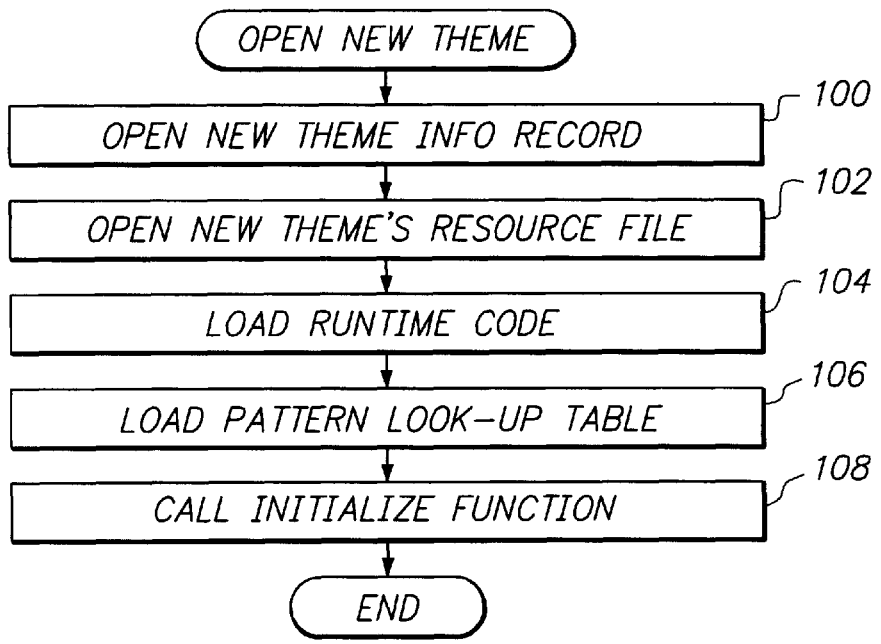
FIG. 7 is a flowchart which illustrates an exemplary method for loading a theme according to exemplary embodiments of the present invention.

The exemplary steps illustrated in the flowchart of FIG. 7 can be executed by the theme engine selected by the appearance management layer to open the new theme file. At block 100, a new theme info record is created. This data structure contains all of the global information that the appearance management layer uses to keep track of the state of the current theme and contains its own resource information, e.g., layouts for objects such as windows and menus, pixmaps, control elements and pattern tables.

The new theme's resource file is then opened at 102 after which the theme's runtime code is loaded, at 104, and its open function is called. At this time, the new theme can test the operating conditions of the system to determine if the load should continue or be aborted. If the load aborts, the theme may present an alert to the user as to why the theme could not be loaded. If the theme has its own preferences file, it can be opened by the theme at this time.

Subsequently, at block 106, the theme's pattern look-up table is loaded. First, all pattern definition procedure resources are loaded. Then the standard pattern look-up table and part index table resources are loaded. The pattern look-up table is then built from the contents of these resources. Lastly, the new theme's initialize function is called at block 108. The new theme can allocate memory or load extra resources that it requires while being active.

Those skilled in the art will appreciate that the foregoing described exemplary embodiments can be implemented using, for example, various types of computer systems. Graphical user interfaces according to the present invention can, for example, be used in conjunction with a computer such as that illustrated in FIG. 8. Therein, a personal computer is illustrated as having a box 160 which contains, among other elements, circuit boards associated with the computer's functions including memory devices and one or more processors, a keyboard 180, a pointing device 200 and a monitor 220 having a display space 240. The computer will also preferably include at least two speakers 260 and 280 associated with at least two audio channels driven by an audio processing component (not shown) in box 160. More than two speakers and two audio channels, e.g., four, may also be provided and those skilled in the art will readily appreciate that the sound effect concepts described below are readily extensible to more than two audio channels. Moreover, the speakers may alternatively be built into the box 160.

Figure 8:
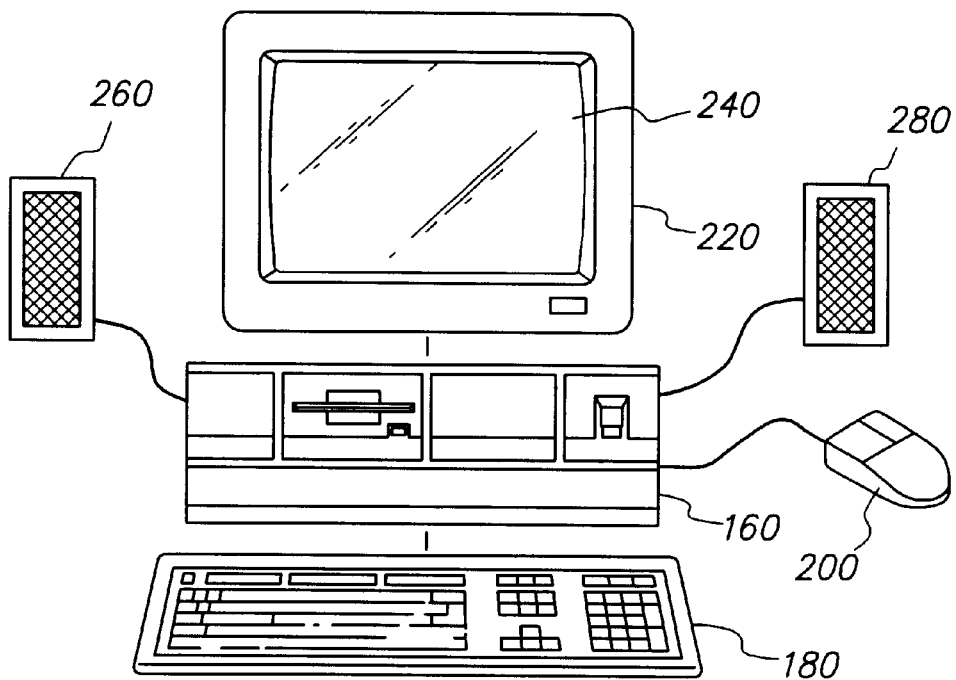
FIG. 8 illustrates an exemplary computer which can be used in conjunction with the present invention.
Figure 9:
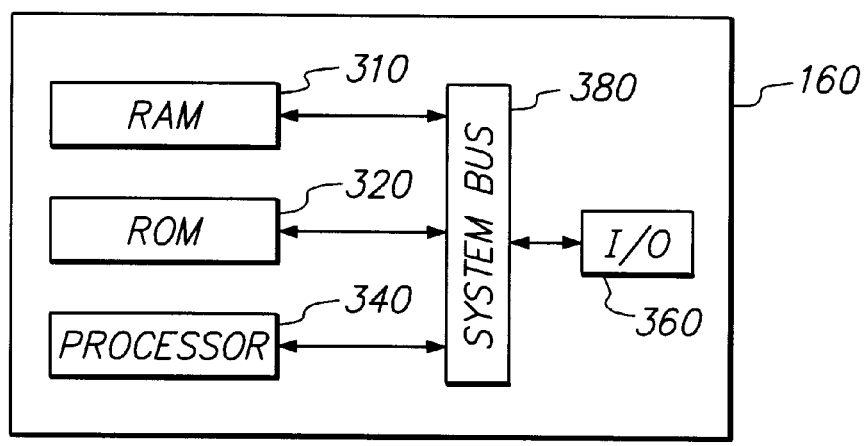
FIG. 9 depicts several functional blocks associated with the computer of FIG. 8.

Of course the personal computer illustrated in FIG. 8 is purely exemplary of one type of computer system in which graphical user interfaces according to the present invention may be implemented. For example, although the display space 240 of the system depicted in FIG. 8 consists of that provided by monitor 220, those skilled in the art will recognize that additional display devices could be arranged proximate monitor 220 to create a display space bridging several monitors. The circuit boards included in box 160 can include boards which accommodate functional units such as those illustrated by the block diagram of FIG. 9. Therein RAM 300, ROM 320, processor 340, and I/O 360 (including sound/audio processing functionality) are all interconnected via system bus 380.

The computer system can also have known I/O devices (e.g., CD drives, floppy disk drives, hard drives, etc.) which can store and read programs and data structures used to implement the above-described techniques. These programs and data structures can be encoded on such computer-readable media. For example, the theme data files above can be stored on computer-readable media independently of the computer-readable medium on which the corresponding theme engine itself resides.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. In a graphical user interface, a method for rendering objects and handling behavior of said objects comprising the steps of:

providing a plurality of themes, each theme controlling an appearance and behavior of objects rendered on said graphical user interface, wherein at least one of said appearance and said behavior is controlled differently for an object when said graphical user interface is operated in accordance with one theme than when said graphical user interface is operated in accordance with another theme;

providing a plurality of theme engines, each theme engine associated with a different theme type, wherein at least one of said theme engines is hard-coded and at least one of said theme engines is a data-driven, parametric engine;

selecting a theme from among said plurality of themes;

identifying one of said plurality of theme engines associated with said selected theme; and loading, by said identified theme engine, theme data for operating said graphical user interface in accordance with said selected theme.

2. The method of claim 1, further comprising the steps of:

providing a plurality of theme data files, each associated with a different theme and each accessible by said data-driven theme engine.

3. The method of claim 1, wherein said hard-coded theme engine can manage only one theme.

4. A computer system comprising:

a processor for performing control functions and processing data;

a display for outputting data received from said processor and for receiving input from a user of said computer system via a graphical user interface; and a plurality of theme engines each capable of rendering a theme by drawing an object on said graphical user interface, wherein a selected one of said theme engines is commanded to draw said object based upon a theme selection coordinated by said processor.

5. The computer system of claim 4, wherein one of said plurality of theme engines is hard-coded.

6. The computer system of claim 5, wherein said hard-coded theme engine has a data file associated therewith that includes only nominal data.

7. The computer system of claim 4, wherein one of said plurality of theme engines is a data-driven, parametric engine.

8. The computer system of claim 7, wherein a plurality of theme data files are stored on a computer-readable medium, each of said plurality of theme data files having a same format which is accessible by said data-driven parametric engine.

9. A method for selecting themes operable to control appearance and behavior of objects rendered on a graphical user interface comprising the steps of:

providing an appearance control panel;

providing a plurality of theme engines, including a default theme engine and at least one other theme engine;

selecting, by said appearance control panel, a theme;

loading said selected theme using one of said plurality of theme engine, unless a valid theme data file cannot be retrieved for said selected theme; and otherwise, loading a default theme using said default theme engine.

10. The method of claim 9, wherein said default theme engine is hard-coded.

11. The method of claim 9, wherein said default theme engine is data-driven.

12. A computer-readable medium having stored thereon computer-readable information for performing the steps of:

providing a plurality of theme engines, each theme engine capable of rendering objects according to at least one theme;

selecting, by one of a user and a program, a current theme; and using a theme engine associated with said current theme to render objects in a graphical user interface according to said current theme.

13. The computer-readable medium of claim 12, wherein said theme provides information relating to object geometries and fill patterns for said objects.

14. The computer-readable medium of claim 12, wherein said step of providing further comprises the step of:

providing a hard-coded theme engine and a data-driven theme engine.

15. The computer-readable medium of claim 12, wherein said step of selecting further comprises the step of:

creating a appearance control panel on said graphical user interface; and receiving input from said user in said appearance control panel as an indication of said selected current theme.

16. The computer-readable medium of claim 12, wherein said step of using a theme engine associated with said current theme further comprises the steps of:

loading, by said theme engine, a data table indicating said object geometries and fill patterns for said current theme; and drawing, by a graphics subsystem, objects on said graphical user interface using information in said data table.

* * * * *